(12) United States Patent
Ohm et al.

(10) Patent No.: US 12,404,391 B2
(45) Date of Patent: *Sep. 2, 2025

(54) GEL EXTRUDED ARTICLES MADE FROM HIGH DENSITY POLYETHYLENE WITH NARROW MOLECULAR WEIGHT DISTRIBUTION

(71) Applicant: Celanese International Corporation, Irving, TX (US)

(72) Inventors: Christian Ohm, Gernsheim (DE); Arvind Yadav, Liederbach am Taunus (DE)

(73) Assignee: Celanese International Corporation, Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,484

(22) Filed: Oct. 12, 2023

(65) Prior Publication Data
US 2024/0343893 A1 Oct. 17, 2024

Related U.S. Application Data

(63) Continuation of application No. 17/410,138, filed on Aug. 24, 2021, now Pat. No. 11,814,508.

(Continued)

(51) Int. Cl.
*C08L 23/06* (2006.01)
*B29C 48/00* (2019.01)
(Continued)

(52) U.S. Cl.
CPC ............ *C08L 23/06* (2013.01); *B29C 48/022* (2019.02); *B29C 48/08* (2019.02); *C08J 5/18* (2013.01);
(Continued)

(58) Field of Classification Search
CPC .......... C08L 23/04; C08L 23/06; C08L 23/08; C08L 23/0815
See application file for complete search history.

(56) References Cited

U.S. PATENT DOCUMENTS 9,911,960 B2    3/2018  Murata et al.
11,814,508 B2 * 11/2023  Ohm ..................... B29C 48/08
(Continued)

FOREIGN PATENT DOCUMENTS

CN      1290272 A    4/2001
CN    103781838 A    5/2014
(Continued)

OTHER PUBLICATIONS

Ansari et al., Rheology of Ziegler-Natta and Metallocene High-Density Polyethylenes: Broad Molecular Weight Distribution Effects, *Rheologica Acta*, vol. 50, © Springer-Verlag 2010, Nov. 2011, pp. 17-27.

(Continued)

*Primary Examiner* — Zachary M Davis
(74) *Attorney, Agent, or Firm* — Dority & Manning, P.A.

(57) ABSTRACT

A polymer composition for producing gel extruded articles is described. The polymer composition contains polyethylene particles combined with a plasticizer. The polyethylene polymer has a narrow molecular weight distribution. Polymer articles made in accordance with the present disclosure have enhanced strength properties. In one embodiment, the polymer composition is used to form a porous membrane for use as a separator in electronic devices.

30 Claims, 2 Drawing Sheets

Related U.S. Application Data (60) Provisional application No. 63/069,469, filed on Aug. 24, 2020.

(51) Int. Cl.
  *B29C 48/08* (2019.01)
  *C08J 5/18* (2006.01)
  *B29K 23/00* (2006.01)

(52) U.S. Cl.
  CPC  *B29K 2023/065* (2013.01); *B29K 2995/0077* (2013.01); *B29K 2995/0081* (2013.01); *C08J 2323/06* (2013.01); *C08L 2203/16* (2013.01); *C08L 2207/062* (2013.01)

(56) References Cited

U.S. PATENT DOCUMENTS

| | | |
|---|---|---|
| 2010/0047599 A1 | 2/2010 | Kvamme et al. |
| 2012/0028104 A1 | 2/2012 | Brant et al. |
| 2012/0034518 A1 | 2/2012 | Ishihara et al. |
| 2013/0045412 A1 | 2/2013 | Takita et al. |
| 2015/0005405 A1 | 1/2015 | Ishihara et al. |
| 2018/0065105 A1 | 3/2018 | Song et al. |
| 2019/0088917 A1 | 3/2019 | Katada et al. |
| 2019/0198836 A1 | 6/2019 | Ishihars |
| 2019/0292332 A1 | 9/2019 | Ohm et al. |

FOREIGN PATENT DOCUMENTS

| | | |
|---|---|---|
| CN | 103864970 A | 6/2014 |
| CN | 107207763 A | 9/2017 |
| CN | 108219242 A | 6/2018 |
| CN | 111032758 A | 4/2020 |
| EP | 2 604 646 A1 | 6/2013 |
| KR | 101926230 B1 | 12/2018 |
| WO | WO2005113657 A1 | 12/2005 |
| WO | WO 2017/170289 | 10/2017 |
| WO | WO2019035083 A2 | 2/2019 |
| WO | WO2019163935 A1 | 6/2023 |

OTHER PUBLICATIONS

International Search Report and The Written Opinion of the International Searching Authority, or the Declaration Corresponding to Application No. PCT/US21/047253 on Dec. 21, 2021.

Chai, *Synthetic Polymer Materials Science*, Beijing Institute of Technology Press, p. 25, Jan. 31, 2019.

Chen, *Study of Polyethylene Separator for Lithium Ion Batteries*, Excellent Master's Degree Thesis in China Text Database—Engineering Science and Technology II, pp. 67-80, Jan. 1, 2015.

Schramm, *A Practical Approach to Rheology and Rheometry*, Petroleum Industry Press, p. 119, May 31, 1998. (Please note that we have attached the 2009 version instead of the 1998 version, with p. 91 accordingly cited.).

European Search Report Corresponding to Application No. 21862526.7 on Dec. 13, 2024.

Japanese Office Action Corresponding to Application No. 2023-513295 on May 23, 2025.

* cited by examiner

GEL EXTRUDED ARTICLES MADE FROM HIGH DENSITY POLYETHYLENE WITH NARROW MOLECULAR WEIGHT DISTRIBUTION

RELATED APPLICATIONS

The present application is a continuation application and claims priority to U.S. patent application Ser. No. 17/410,138, having a filing date of Aug. 24, 2021, which is based on and claims priority to U.S. Provisional Patent Application Ser. No. 63/069,469, having a filing date of Aug. 24, 2020, both of which is are incorporated herein by reference in their entirety.

BACKGROUND

Polyethylene polymers have numerous and diverse uses and applications. For example, high density polyethylenes are valuable engineering plastics, with a unique combination of abrasion resistance, surface lubricity, chemical resistance and impact strength. They find application in the production of high strength fibers for use in ropes and anti-ballistic shaped articles and in the production of other elongated articles, such as membranes for electronic devices. However, since the flowability of these materials in the molten state decreases as the molecular weight increases, processing by conventional techniques, such as melt extrusion, is not always possible.

One alternative method for producing fibers and other elongated components from polyethylene polymers is by gel-processing in which the polymer is combined with a solvent. The resultant gel is extruded into a fiber or membrane, and may be stretched in one or two directions. Also, part or all of the solvent may be removed from the product.

Membranes made from polyethylene polymers through gel-processing can be formed to have many beneficial properties. For instance, the membranes can be formed with micro-pores. Microporous polyethylene membranes formed through gel-processing, for instance, are particularly well suited for use as a separator in a battery, such as a lithium ion battery. The microporous membrane, for instance, can separate an anode from a cathode and prevent a short circuit between the active battery components. At the same time, the microporous membrane permits ions to pass through due to the porous nature of the material. The ion permeability characteristics of the microporous polyethylene membrane makes the material particularly well suited for regulating electrochemical reactions within the battery.

When producing films and fibers for producing ropes, anti-ballistic articles, fabrics and apparel, and membranes for lithium ion batteries from gel extruded polymer compositions, the fibers and films should have excellent mechanical properties. Consequently, a continuing need exists for improving the mechanical properties, such as the strength characteristics, of gel extruded articles. The present disclosure is directed to improving at least one of the above properties through the use of particular polymers and polymer formulations.

SUMMARY

In general, the present disclosure is directed to polyolefin compositions well suited for gel-processing applications. More particularly, the present disclosure is directed to a polymer composition containing a high density polyethylene polymer well suited for producing microporous, ion permeable membranes that may be used as separators in batteries. The polymer composition of the present disclosure is also well suited to producing anti-ballistic articles, fabrics, apparel and garments including gloves, ropes, fishing line, and the like. In accordance with the present disclosure, the polymer composition is formulated so as to have improved mechanical or physical properties. More particularly, the present disclosure is directed to formulating polyethylene polymer compositions that have improved tensile strength and/or puncture resistance when gel extruded into microporous membranes.

In one embodiment, the present disclosure is directed to a polymer composition for producing gel extruded articles. The polymer composition comprises a plasticizer, combined with polymer particles comprising a high density polyethylene polymer. In accordance with the present disclosure, the high density polyethylene polymer has a narrow molecular weight distribution that has been found to provide various advantages and benefits. The high density polyethylene polymer, for instance, can have an intercrossing point (ICP) of greater than about 150 kPa, such as greater than about 160 kPa, such as greater than about 165 kPa, such as greater than about 168 kPa. The high density polyethylene polymer can also have a polydispersity index (PDI) of less than about 8, such as less than about 7, such as less than about 6.5. The high density polyethylene polymer can have a narrow molecular weight distribution and still be formed from the use of a Ziegler-Natta catalyst. Thus, the polyethylene polymer of the present disclosure can be free of metallocenes.

The high density polyethylene particles can, in one embodiment, have a median particle size by volume of less than about 150 microns, such as less than about 125 microns, and generally greater than about 50 microns.

In general, the polymer composition contains the high density polyethylene resin in an amount up to about 50% by weight. The plasticizer, for instance, can be present in the composition in an amount greater than about 50% by weight, such as in an amount greater than about 60% by weight, such as in an amount greater than about 70% by weight, such as in an amount greater than about 80% by weight, such as in an amount less than about 90% by weight. Various different materials can be used as the plasticizer. For instance, the plasticizer may comprise a mineral oil, a paraffinic oil, a hydrocarbon oil, an alcohol, or the like. For instance, the plasticizer may comprise decaline, xylene, dioctyl phthalate, dibutyl phthalate, stearyl alcohol, oleyl alcohol, decyl alcohol, nonyl alcohol, diphenyl ether, n-decane, n-dodecane, or mixtures thereof. In one embodiment, the plasticizer may comprise a C5-C12 hydrocarbon, such as a C5-C12 saturated hydrocarbon. For example, the plasticizer may comprise heptane, hexane, a paraffin, or the like.

In one embodiment, the high density polyethylene used to produce the particles can have a relatively high molecular weight. The use of higher molecular weight polyethylene particles may be beneficial, especially in applications where greater strength properties are needed or desired. For example, the polyethylene used to produce the particles can have a molecular weight of greater than about 400,000 g/mol, such as greater than about 500,000 g/mol, such as greater than about 600,000 g/mol, such as greater than about 700,000 g/mol, and less than about 4,000,000 g/mol, such as less than about 3,500,000 g/mol. In one aspect, the high density polyethylene polymer can have a molecular weight of greater than about 500,000 g/mol and less than about 1,500,000 g/mol. In one embodiment, the composition only contains a single polyethylene polymer.

The present disclosure is also directed to polymer articles formed from the above polymer composition. The polymer articles can be produced through a gel extrusion or gel-spinning process. Polymer articles made in accordance with the present disclosure include fibers, films, such as membranes, or the like.

During the formation of polymer articles, a significant portion of the plasticizer is removed. For example, in one aspect, greater than 95% by weight, such as greater than about 98% by weight of the plasticizer is removed in forming the polymer article. Consequently, polymer articles made in accordance with the present disclosure generally contain the high density polyethylene and possibly other additives. For example, the resulting polymer article can contain the high density polyethylene polymer in an amount from about 60% to about 98% by weight, such as in an amount from about 65% by weight to about 97% by weight. One or more additives can be present in the polymer article in an amount greater than about 0.05% by weight, such as in an amount greater than about 0.08% by weight, such as in an amount greater than about 0.1% by weight, and generally in an amount less than about 2.1% by weight, such as in an amount less than about 1.2% by weight, such as in an amount less than about 0.5% by weight.

The present disclosure is also directed to a process for producing polymer articles. The process includes the steps of forming a gel-like composition from the polymer composition described above. The gel-like composition is then extruded through a die to form a polymer article. The polymer article, for instance, may comprise fibers, a continuous film, or a discontinuous film, such as a porous membrane.

In one embodiment, an extraction solvent, such as dichloromethane is combined with the polymer composition before or during formation of the polymer article. The extraction solvent can be used to facilitate removal of the plasticizer.

Porous membranes made in accordance with the present disclosure can have an excellent blend of physical properties. For example, the membrane can have a puncture strength of greater than about 500 mN/µm, such as greater than about 600 mN/µm, such as greater than about 700 mN/µm, such as greater than about 800 mN/µm. The membrane can have a tensile strength in at least one direction of greater than about 90 MPa. The above properties can be obtained when forming the membrane from a Ziegler-Natta catalyzed high density polyethylene having a molecular weight of greater than about 400,000 g/mol and less than about 900,000 g/mol. The above properties can also be obtained from membranes having a thickness of from about 7 microns to about 11 microns, such as from about 7.5 microns to about 10 microns. The membranes can have a Gurley permeability of greater than about 105 sec/100 ml. In one aspect, the porous membrane can be biaxially stretched.

Other features and aspects of the present disclosure are discussed in greater detail below.

BRIEF DESCRIPTION OF THE DRAWINGS

The present disclosure may be better understood with reference to the following figures.

Repeat use of reference characters in the present specification and drawings is intended to represent the same or analogous features or elements of the present invention.

Definitions

As used herein, puncture strength is measured according to ASTM Test D3763 and measures the ability of a membrane to withstand a foreign particle from causing a hole or defect. The test is conducted on a testing device, such as an Instron CEAST 9340 device. The drop height is 0.03 to 1.10 m. The impact velocity is 0.77 to 4.65 m/s. The maximum dropping mass is 37.5 kg and the maximum potential energy is 405 J. Puncture strength is measured in slow speed puncture mode at 1.67 mm/s.

The melt flow rate of a polymer or polymer composition is measured according to ISO Test 1133 at 190° C. and at a load of 21.6 kg.

The density of a polymer is measured according to ISO Test 1183 in units of $g/cm^3$.

Average particle size (d50) is measured using laser diffraction/light scattering, such as a suitable Horiba light scattering device.

The average molecular weight of a polymer is determined using the Margolies' equation.

Tensile modulus, tensile stress at yield, tensile strain at yield, tensile stress at 50% break, tensile stress at break, and tensile nominal strain at break are all measured according to ISO Test 527-2/1B.

Gurley permeability can be measured according to the Gurley Test, using a Gurley permeability tester, such as Gurley Densometer, Model KRK 2060c commercially available from Kumagai Riki Kogyo Co., LTD. The test is conducted according to ISO Test 5636. The Gurley Test measures air permeability as a function of the time required for a specified amount of air to pass through a specified area under a specified pressure. The units are reported in sec/100 ml.

The intercrossing point (ICP) of a polymer involves compression molding a sample, followed by the measurement of a frequency sweep in a plate-plate geometry rheometer at a temperature of 190° C., at a force of 0.1 N, and an amplitude of 1%. The obtained data are a plot of storage modulus (G') and loss modulus (G") versus the applied frequency. The intercrossing point is the point where G'=G". A higher ICP indicates a material with a narrow molecular weight distribution.

Polydispersity Index is measured using HT-GPC. Analytical HT-GPC is performed at 150° C. using a PL220 GPC oven (Agilent, Waldbronn, Germany) with corresponding isocratic pump. The mobile phase was 1,2,4-trichlorobenzene (TCB) (Merck, Darmstadt, Germany). ~1 g/L Butylated hydroxytoluene (BHT) was added to the TCB as antioxidant. The flow rate was 1 mL/min. The stationary phase included an Agilent PLgel Olexis Guard column (50×7.5 mm, precolumn) as well as three TOSOH Bioscience TSKgel GMHHR-H(S) HT (300×7.8 mm) analytical columns. Detection was realized using an IR detector (model IR4, PolymerChar, Valencia, Spain). Elution times were calibrated using polystyrene standards (EasiCal PS-1, Agilent, Waldbronn, Germany). Data evaluation was performed using WinGPC software (Polymer Standards Service, Mainz, Germany) and Astra software (Wyatt Technologies, Dernbach Germany). Further processing is a performed using Origin 9.1 (OriginLab Corporation, Northampton, MA, USA) software.

Sample preparation: Two separate vials are filled with approx. 3 mg of the respective polymer sample each. 1.5 mL TCB (mobile phase, see above) are added to each vial. The samples are dissolved for approx. 3 hours at 160° C. in an external heater prior to the analysis. Immediately before analysis, the samples are redissolved for at least an hour at 150° C. in the autosampler.

The polydispersity Index (PDI) is calculated as Mw/Mn. A lower PDI indicates a polymer with a narrower molecular weight distribution.

DETAILED DESCRIPTION

It is to be understood by one of ordinary skill in the art that the present discussion is a description of exemplary embodiments only and is not intended as limiting the broader aspects of the present disclosure.

In general, the present disclosure is directed to a polymer composition well suited for producing gel extruded articles, such as fibers and films, including porous membranes. The polymer composition contains a polyethylene resin, such as high density polyethylene particles, combined with a plasticizer. In accordance with the present disclosure, the polyethylene particles are formed from a high molecular weight polyethylene that has a relatively narrow molecular weight distribution which has been found to dramatically improve various properties of articles made from the composition.

Fibers and films made from the polymer composition of the present disclosure can be used in diverse and numerous different applications. For instance, the polymer composition can be used to produce anti-ballistic articles, cut-resistant gloves, ropes such as mooring ropes, fishing line, and the like. Fibers made according to the present disclosure can also be used to produce various different types of fabric.

Films made according to the present disclosure can comprise porous membranes. The porous membranes can be used in various different applications. For instance, the porous membranes can be used to produce water-proof but breathable clothing, filtration membranes and the like. Porous membranes made according to the present disclosure are particularly well suited as a separator for electronic devices, such as a battery. For example, in one aspect, the membrane can be a separator in a lithium ion battery.

As described above, the polymer composition of the present disclosure contains a particular type of polyethylene polymer combined with a plasticizer. The polymer composition can be used to form articles in a process known as gel-processing. During the process, the high density polyethylene resin is dissolved in the plasticizer, which can be an oil or hydrocarbon. The polymer is dissolved in the plasticizer using heat and mechanical mixing. The resulting gel-like material is then shaped either into a strand for producing fibers or into a sheet for producing films such as membranes. Upon cooling, the high density polyethylene phase separates from the plasticizer and the article solidifies. During the process, the article being produced can be stretched. For example, fibers can be stretched in the longitudinal direction, while films can be unidirectionally stretched or biaxially stretched. In one aspect, for instance, a porous membrane is produced that is stretched in both the longitudinal or machine direction and the lateral or cross-machine direction. Stretching the polymer article induces chain orientation which can improve mechanical performance and various mechanical properties, such as tensile strength.

There is a continuing need in the industry to improve the strength characteristics of gel extruded polyethylene articles. In the past, strength was increased by increasing the molecular weight of the resin. Increasing the molecular weight of the resin, however, creates processing challenges. The present disclosure is directed to using a high density polyethylene polymer having a narrow molecular weight distribution which allows for dramatic increases in strength and other physical properties without having to resort to a polyethylene polymer having an extremely high molecular weight.

As described above, the polyethylene polymer can be a high density polyethylene polymer that is used to form the primary polymer component and the matrix polymer of articles produced according to the present disclosure. The high density polyethylene has a density of about $0.93 \text{ g/cm}^3$ or greater, such as about $0.94 \text{ g/cm}^3$ or greater, such as about $0.95 \text{ g/cm}^3$ or greater, and generally less than about $1 \text{ g/cm}^3$, such as less than about $0.96 \text{ g/cm}^3$.

The high density polyethylene polymer can be made from over 90% ethylene derived units, such as greater than 95% ethylene derived units, or from 100% ethylene derived units. The polyethylene can be a homopolymer or a copolymer, including a terpolymer, having other monomeric units.

The high density polyethylene can be a high molecular weight polyethylene, a very high molecular weight polyethylene, and/or an ultrahigh molecular weight polyethylene. "High molecular weight polyethylene" refers to polyethylene compositions with an average molecular weight of at least about $3\times10^5$ g/mol and, as used herein, is intended to include very-high molecular weight polyethylene and ultra-high molecular weight polyethylene. For purposes of the present specification, the molecular weights referenced herein are determined in accordance with the Margolies equation ("Margolies molecular weight").

"Very-high molecular weight polyethylene" refers to polyethylene compositions with a weight average molecular weight of less than about $3\times10^6$ g/mol and more than about $1\times10^6$ g/mol. In some embodiments, the molecular weight of the very-high molecular weight polyethylene composition is between about $2\times10^6$ g/mol and less than about $3\times10^6$ g/mol.

"Ultra-high molecular weight polyethylene" refers to polyethylene compositions with an average molecular weight of at least about $3\times10^6$ g/mol. In some embodiments, the molecular weight of the ultra-high molecular weight polyethylene composition is between about $3\times10^6$ g/mol and about $30\times10^6$ g/mol, or between about $3\times10^6$ g/mol and about $20\times10^6$ g/mol, or between about $3\times10^6$ g/mol and about $10\times10^6$ g/mol, or between about $3\times10^6$ g/mol and about $6\times10^6$ g/mol.

In one aspect, the high density polyethylene is a homopolymer of ethylene. In another embodiment, the high density polyethylene may be a copolymer. For instance, the high density polyethylene may be a copolymer of ethylene and another olefin containing from 3 to 16 carbon atoms, such as from 3 to 10 carbon atoms, such as from 3 to 8 carbon atoms. These other olefins include, but are not limited to, propylene, 1-butene, 1-pentene, 1-hexene, 1-heptene, 1-octene, 4-methylpent-1-ene, 1-decene, 1-dodecene, 1-hexadecene and the like. Also utilizable herein are polyene comonomers such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene. However, when present, the amount of the non-ethylene monomer(s) in the copolymer may be less than about 10 mol. %, such as less than about 5 mol. %, such as less than about 2.5 mol. %, such as less than about 1 mol. %, wherein the mol. % is based on the total moles of monomer in the polymer.

In accordance with the present disclosure, the high density polyethylene polymer has a relatively narrow molecular weight distribution. The molecular weight distribution can be determined by measuring the intercrossing point of the polymer or by measuring the polydispersity index of the polymer. The high density polyethylene polymer of the present disclosure generally has an intercrossing point of greater than about 150 kPa. More particularly, the polyethylene polymer can have an intercrossing point of greater than about 155 kPa, such as greater than about 160 kPa, such as greater than about 165 kPa, such as greater than about 170 kPa, such as greater than about 175 kPa. The intercrossing point of the polyethylene polymer is generally less than about 250 kPa, such as less than about 200 kPa, such as less than about 190 kPa.

The polydispersity index of the polyethylene polymer can generally range from about 2 to about 8, including all increments of 0.1 therebetween. For instance, the polydispersity index of the polyethylene polymer can be less than about 8, such as less than about 7.75, such as less than about 7.5, such as less than about 7.25, such as less than about 7, such as less than about 6.75, such as less than about 6.5, such as less than about 6.25. The polydispersity index of the polyethylene polymer is generally greater than about 2.5, such as greater than about 3, such as greater than about 3.5, such as greater than about 4, such as greater than about 4.5.

Although formed with a relatively narrow molecular weight distribution, the high density polyethylene polymer of the present disclosure can be Ziegler-Natta catalyzed as opposed to using a single site catalyst, such as metallocene. For instance, in one aspect, the high density polyethylene polymer is metallocene-free. Suitable catalyst systems are commercially available from Designed Chemistry AB.

The polyethylene powder is typically produced by the catalytic polymerization of ethylene monomer or optionally with one or more other 1-olefin co-monomers, the 1-olefin content in the final polymer being less or equal to 10% of the ethylene content, with a heterogeneous catalyst and an organo aluminum or magnesium compound as cocatalyst. The ethylene is usually polymerized in gaseous phase or slurry phase at relatively low temperatures and pressures. The polymerization reaction may be carried out at a temperature of between 50° C. and 100° C. and pressures in the range of 0.02 and 2 MPa.

The molecular weight of the polyethylene can be adjusted by adding hydrogen. Altering the temperature and/or the type and concentration of the co-catalyst may also be used to fine tune the molecular weight. Additionally, the reaction may occur in the presence of antistatic agents to avoid fouling and product contamination.

Typically Ziegler-Natta type catalysts are derived by a combination of transition metal compounds of Groups 4 to 8 of the Periodic Table and alkyl or hydride derivatives of metals from Groups 1 to 3 of the Periodic Table. Transition metal derivatives used usually comprise the metal halides or esters or combinations thereof. Exemplary Ziegler-Natta catalysts include those based on the reaction products of organo aluminum or magnesium compounds, such as for example but not limited to aluminum or magnesium alkyls and titanium, vanadium or chromium halides or esters. The heterogeneous catalyst might be either unsupported or supported on porous fine grained materials, such as silica or magnesium chloride. Such support can be added during synthesis of the catalyst or may be obtained as a chemical reaction product of the catalyst synthesis itself.

In one embodiment, a suitable catalyst system can be obtained by the reaction of a titanium (IV) compound with a trialkyl aluminum compound in an inert organic solvent at temperatures in the range of −40° C. to 100° C., preferably −20° C. to 50° C. The concentrations of the starting materials are in the range of 0.1 to 9 mol/L, preferably 0.2 to 5 mol/L, for the titanium (IV) compound and in the range of 0.01 to 1 mol/L, preferably 0.02 to 0.2 mol/L for the trialkyl aluminum compound. The titanium component is added to the aluminum component over a period of 0.1 min to 60 min, preferably 1 min to 30 min, the molar ratio of titanium and aluminum in the final mixture being in the range of 1:0.01 to 1:4.

In another embodiment, a suitable catalyst system is obtained by a one or two-step reaction of a titanium (IV) compound with a trialkyl aluminum compound in an inert organic solvent at temperatures in the range of −40° C. to 200° C., preferably −20° C. to 150° C. In the first step the titanium (IV) compound is reacted with the trialkyl aluminum compound at temperatures in the range of −40° C. to 100° C., preferably −20° C. to 50° C. using a molar ratio of titanium to aluminum in the range of 1:0.1 to 1:0.8. The concentrations of the starting materials are in the range of 0.1 to 9.1 mol/L, preferably 5 to 9.1 mol/L, for the titanium (IV) compound and in the range of 0.05 and 1 mol/L, preferably 0.1 to 0.9 mol/L for the trialkyl aluminum compound. The titanium component is added to the aluminum compound over a period of 0.1 min to 800 min, preferably 30 min to 600 min. In a second step, if applied, the reaction product obtained in the first step is treated with a trialkyl aluminum compound at temperatures in the range of −10° C. to 150° C., preferably 10° C. to 130° C. using a molar ratio of titanium to aluminum in the range of 1:0.01 to 1:5.

In yet another embodiment, a suitable catalyst system is obtained by a procedure wherein, in a first reaction stage, a magnesium alcoholate is reacted with a titanium chloride in an inert hydrocarbon at a temperature of 50° to 100° C. In a second reaction stage the reaction mixture formed is subjected to heat treatment for a period of about 10 to 100 hours at a temperature of 110° to 200° C. accompanied by evolution of alkyl chloride until no further alkyl chloride is evolved, and the solid is then freed from soluble reaction products by washing several times with a hydrocarbon.

In a further embodiment, catalysts supported on silica, such as for example the commercially available catalyst system Sylopol 5917 can also be used.

Using such catalyst systems, the polymerization is normally carried out in suspension at low pressure and temperature in one or multiple steps, continuous or batch. The polymerization temperature is typically in the range of 30° C. to 130° C., preferably is the range of 50° C. and 90° C. and the ethylene partial pressure is typically less than 10 MPa, preferably 0.05 and 5 MPa. Trialkyl aluminums, like for example but not limited to isoprenyl aluminum and triisobutyl aluminum, are used as co-catalyst such that the ratio of Al:Ti (co-catalyst versus catalyst) is in the range of 0.01 to 100:1, more preferably is the range of 0.03 to 50:1. The solvent is an inert organic solvent as typically used for Ziegler type polymerizations. Examples are butane, pentane, hexane, cyclohexene, octane, nonane, decane, their isomers and mixtures thereof. The polymer molecular mass is controlled through feeding hydrogen. The ratio of hydrogen partial pressure to ethylene partial pressure is in the range of 0 to 50, preferably the range of 0 to 10. The polymer is isolated and dried in a fluidized bed drier under nitrogen. The solvent may be removed through steam distillation in case of using high boiling solvents. Salts of long chain fatty acids may be added as a stabilizer. Typical examples are calcium, magnesium and zinc stearate.

In accordance with the present disclosure, the high density polyethylene polymer is formed into particles and combined with a plasticizer. In one embodiment, the polyethylene particles are made from a polyethylene polymer having a bulk density as measured according to DIN53466 of generally less than about 0.4 g/cm³, such as less than about 0.35 g/cm³, such as less than about 0.33 g/cm³, such as less than about 0.3 g/cm³, such as less than about 0.28 g/cm³, such as less than about 0.26 g/cm³. The bulk density is generally greater than about 0.1 g/cm³, such as greater than about 0.15 g/cm³. In one aspect, the bulk density can be greater than about 0.3 g/cm³, such as greater than about 0.31 g/cm³.

In one embodiment, the polyethylene particles can be a free-flowing powder. The particles can have a median particle size (d50) by volume of less than 300 microns. For example, the median particle size (d50) of the polyethylene particles can be less than about 150 microns, such as less than about 125 microns. The median particle size (d50) is generally greater than about 20 microns. The powder particle size can be measured utilizing a laser diffraction method according to ISO 13320.

In one embodiment, 90% of the polyethylene particles can have a particle size of less than about 250 microns. In other embodiments, 90% of the polyethylene particles can have a particle size of less than about 200 microns, such as less than about 170 microns.

The molecular weight of the polyethylene polymer can vary depending upon the particular application. The polyethylene polymer, for instance, may have an average molecular weight, as determined according to the Margolies equation. The molecular weight can be determined by first measuring the viscosity number according to DIN EN ISO Test 1628. Dry powder flow is measured using a 25 mm nozzle. The molecular weight is then calculated using the Margolies equation from the viscosity numbers. The average molecular weight is generally greater than about 400,000 g/mol, such as greater than about 500,000 g/mol, such as greater than about 600,000 g/mol, such as greater than about 700,000 g/mol, such as greater than about 800,000 g/mol, such as greater than about 1,000,000 g/mol, such as greater than about 1,500,000 g/mol. The average molecular weight is generally less than about 12,000,000 g/mol, such as less than about 10,000,000 g/mol. In one aspect, the number average molecular weight of the high density polyethylene polymer can be less than about 4,000,000 g/mol, such as less than about 3,000,000 g/mol, such as less than about 1,500,000 g/mol.

In one aspect, the composition or membrane can include only a single polyethylene polymer. The single polyethylene polymer can have an average molecular weight of from about 500,000 g/mol to about 1,000,000 g/mol and can have a narrow molecular weight distribution as described above.

The polyethylene may have a viscosity number of from at least 100 mL/g, such as at least 500 mL/g, such as at least 550 mL/g, to less than about 6,000 mL/g, such as less than about 5,000 mL/g, such as less than about 4000 mL/g, such as less than about 3,000 mL/g, such as less than about 1,000 mL/g, as determined according to ISO 1628 part 3 utilizing a concentration in decahydronapthalene of 0.0002 g/mL.

The high density polyethylene may have a crystallinity of from at least about 40% to 85%, such as from 45% to 80%. In one aspect, the crystallinity can be greater than about 50%, such as greater than about 55%, such as greater than about 60%, such as greater than about 65%, such as greater than about 70%, and generally less than about 80%.

In general, the high density polyethylene particles are present in the polymer composition in an amount up to about 50% by weight. For instance, the high density polyethylene particles can be present in the polymer composition in an amount less than about 45% by weight, such as in an amount less than about 40% by weight, such as in an amount less than about 35% by weight, such as in an amount less than about 30% by weight, such as in an amount less than about 25% by weight, such as in an amount less than about 20% by weight, such as in an amount less than about 15% by weight. The polyethylene particles can be present in the composition in an amount greater than about 5% by weight, such as in an amount greater than about 10% by weight, such as in an amount greater than about 15% by weight, such as in an amount greater than about 20% by weight, such as in an amount greater than about 25% by weight.

During gel processing, a plasticizer is combined with the high density polyethylene particles which can be substantially or completely removed in forming polymer articles. For example, in one embodiment, the resulting polymer article can contain the high density polyethylene polymer in an amount greater than about 70% by weight, such as in an amount greater than about 80% by weight, such as in an amount greater than about 85% by weight, such as in an amount greater than about 90% by weight, such as in an amount greater than about 95% by weight.

In addition to the high density polyethylene particles, the polymer composition further contains a plasticizer. In general, any suitable plasticizer can be combined with the polyethylene as long as the plasticizer is capable of forming a gel-like material suitable for gel spinning or extruding.

The plasticizer, for instance, may comprise a hydrocarbon oil, an alcohol, an ether, an ester such as a diester, or mixtures thereof. For instance, suitable plasticizers include mineral oil, a paraffinic oil, decaline, and the like. Other plasticizers include xylene, dioctyl phthalate, dibutyl phthalate, stearyl alcohol, oleyl alcohol, decyl alcohol, nonyl alcohol, diphenyl ether, n-decane, n-dodecane, octane, nonane, kerosene, toluene, naphthalene, tetraline, and the like. In one embodiment, the plasticizer may comprise a halogenated hydrocarbon, such as monochlorobenzene. Cycloalkanes and cycloalkenes may also be used, such as camphene, methane, dipentene, methylcyclopentandiene, tricyclodecane, 1,2,4,5-tetramethyl-1,4-cyclohexadiene, and the like. The plasticizer may comprise mixtures and combinations of any of the above as well.

The plasticizer is generally present in the composition used to form the polymer articles in an amount greater than about 50% by weight, such as in an amount greater than about 55% by weight, such as in an amount greater than about 60% by weight, such as in an amount greater than about 65% by weight, such as in an amount greater than about 70% by weight, such as in an amount greater than about 75% by weight, such as in an amount greater than about 80% by weight, such as in an amount greater than about 85% by weight, such as in an amount greater than about 90% by weight, such as in an amount greater than about 95% by weight, such as in an amount greater than about 98% by weight. In fact, the plasticizer can be present in an amount up to about 99.5% by weight.

The high density polyethylene particles and the plasticizer form a homogeneous gel-like material.

In order to form polymer articles in accordance with the present disclosure, the high density polyethylene particles are combined with the plasticizer and extruded through a die of a desired shape. In one embodiment, the composition can be heated within the extruder. For example, the plasticizer can be combined with the particle mixture and fed into an extruder. In accordance with the present disclosure, the plasticizer and particle mixture form a homogeneous gel-like material prior to leaving the extruder for forming polymer articles with little to no impurities.

In one embodiment, elongated articles are formed during the gel spinning or extruding process. The polymer article, for instance, may be in the form of a fiber or a film, such as a membrane.

During the process, at least a portion of the plasticizer is removed from the final product. The plasticizer removal process may occur due to evaporation when a relatively volatile plasticizer is used. Otherwise, an extraction liquid can be used to remove the plasticizer. The extraction liquid may comprise, for instance, a hydrocarbon solvent. One example of the extraction liquid, for instance, is dichloromethane. Other extraction liquids include acetone, chloroform, an alkane, hexene, heptene, an alcohol, or mixtures thereof.

If desired, the resulting polymer article can be stretched at an elevated temperature below the melting point of the polymer mixture to increase strength and modulus. Suitable temperatures for stretching are in the range of from about ambient temperature to about 155° C. The draw ratios can generally be greater than about 4, such as greater than about 6, such as greater than about 8, such as greater than about 10, such as greater than about 15, such as greater than about 20, such as greater than about 25, such as greater than about 30. In certain embodiments, the draw ratio can be greater than about 50, such as greater than about 100, such as greater than about 110, such as greater than about 120, such as greater than about 130, such as greater than about 140, such as greater than about 150. Draw ratios are generally less than about 1,000, such as less than about 800, such as less than about 600, such as less than about 400. In one embodiment, lower draw ratios are used such as from about 4 to about 10. The polymer article can be uniaxially stretched or biaxially stretched.

Polymer articles made in accordance with the present disclosure have numerous uses and applications. For example, in one embodiment, the process is used to produce a membrane. The membrane can be used, for instance, as a battery separator. Alternatively, the membrane can be used as a microfilter. When producing fibers, the fibers can be used to produce nonwoven fabrics, ropes, nets, and the like. In one embodiment, the fibers can be used as a filler material in ballistic apparel.

Figure 1:
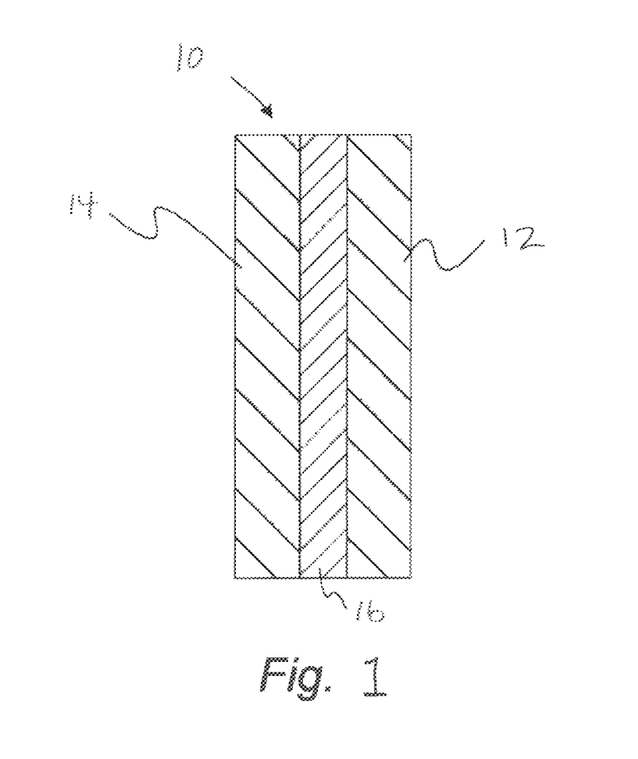
FIG. 1 is a cross-sectional view of an electronic device, such as a battery, incorporating a porous membrane made in accordance with the present disclosure.

Referring to FIG. 1, one embodiment of a lithium ion battery 10 made in accordance with the present disclosure is shown. The battery 10 includes an anode 12 and a cathode 14. The anode 12, for instance, can be made from a lithium metal. The cathode 14, on the other hand, can be made from sulfur or from an intercalated lithium metal oxide. In accordance with the present disclosure, the battery 10 further includes a porous membrane 16 or separator that is positioned between the anode 12 and the cathode 14. The porous membrane 16 minimizes electrical shorts between the two electrodes while allowing the passage of ions, such as lithium ions. As shown in FIG. 1, in one embodiment, the porous membrane 16 is a single layer polymer membrane and does not include a multilayer structure. In one aspect, the single layer polymer membrane may also include a coating. The coating can be an inorganic coating made from, for instance, aluminum oxide or a titanium oxide. Alternatively, the single layer polymer membrane may also include a polymeric coating. The coating can provide increased thermal resistance.

Membranes made according to the present disclosure, such as for use in a lithium ion battery as described above, can generally have a thickness of greater than about 5 microns, such as greater than about 6 microns, such as greater than about 7 microns, and generally less than about 20 microns, such as less than about 15 microns, such as less than about 12 microns, such as less than about 10 microns. The membranes can have a Gurley permeability of less than about 200 sec/100 ml, such as less than about 180 sec/100 ml, such as less than about 150 sec/100 ml, such as less than about 130 sec/100 ml, such as less than about 120 sec/100 ml. The Gurley permeability is generally greater than about 50 sec/100 ml, such as greater than about 80 sec/100 ml, such as greater than about 100 sec/100 ml.

Membranes made according to the present disclosure can have improved and enhanced strength properties. For instance, when forming a membrane according to the present disclosure from a polyethylene polymer having a relatively narrow molecular weight distribution and having a molecular weight of from about 500,000 g/mol to about 900,000 g/mol, the membrane can have a tensile strength in at least one direction of greater than about 90 MPa, such as greater than about 95 MPa, such as greater than about 100 MPa, such as greater than about 105 MPa, and generally less than about 200 MPa, such as less than about 150 MPa. The puncture strength of the membrane can be greater than about 700 mN/µm, such as greater than about 725 mN/µm, such as greater than about 750 mN/µm, and generally less than about 1,400 mN/µm, such as less than about 1,200 mN/µm.

In one embodiment, the tensile strength of membranes made according to the present disclosure can have a relationship to the molecular weight of the polymer. The relationship can depend on many factors including the composition of the polymer, the manner in which the membrane is made, etc. In one aspect, the tensile strength of the membrane (MPa) can be equal to or greater than 0.06*molecular weight of the polymer (kg/mol)+65.2.

The polymer composition and polymer articles made in accordance with the present disclosure may contain various other additives, such as heat stabilizers, light stabilizers, UV absorbers, acid scavengers, flame retardants, lubricants, colorants, and the like.

In one aspect, a nucleating agent can be present in the polymer composition for increasing strength. Nucleating agents that may be used in accordance with the present disclosure include metal salts or alkali salts of one or more carboxylic acids, such as metal salts of dicarboxylic acids. In one aspect, a metal salt or alkali salt of a cyclic carboxylic acid may be used. Other nucleating agents that may be used in accordance with the present disclosure include metal salts or alkali salts of one or more phosphates. In one aspect, for instance, the nucleating agent is a metal salt or alkali salt of an aromatic phosphate.

Various mixtures of nucleating agents may also be incorporated into the composition. For instance, in one aspect, two different phosphate salts may be used. Alternatively, a phosphate salt can be combined with a salt of a carboxylic acid. In still another embodiment, the composition may contain a salt of a carboxylic acid combined with two different phosphate salts.

Particular examples of nucleating agents include disodium bicyclo[2.2.1]heptane-2,3-dicarboxylate, sodium 2,2'-methylenebis-(4,6-di-tert-butylphenyl) phosphate, lithium 2,2'-methylenebis-(4,6-di-tert-butylphenyl) phosphate, or mixtures thereof.

In one aspect, polymer articles, such as polymer membranes, made in accordance with the present disclosure, can contain one or more nucleating agents in an amount greater than about 0.01% by weight, such as in an amount greater than about 0.05% by weight, such as in an amount greater than about 0.08% by weight, such as in an amount greater than about 1.1% by weight. One or more nucleating agents can be present in the polymer article in an amount less than about 2.1% by weight, such as in an amount less than about 1.2% by weight, such as in an amount less than about 0.5% by weight.

In one embodiment, a heat stabilizer may be present in the composition. The heat stabilizer may include, but is not limited to, phosphites, aminic antioxidants, phenolic antioxidants, or any combination thereof.

In one embodiment, an antioxidant may be present in the composition. The antioxidant may include, but is not limited to, secondary aromatic amines, benzofuranones, sterically hindered phenols, or any combination thereof.

In one embodiment, a light stabilizer may be present in the composition. The light stabilizer may include, but is not limited to, 2-(2'-hydroxyphenyl)-benzotriazoles, 2-hydroxy-4-alkoxybenzophenones, nickel containing light stabilizers, 3,5-di-tert-butyl-4-hydroxbenzoates, sterically hindered amines (HALS), or any combination thereof.

In one embodiment, a UV absorber may be present in the composition in lieu of or in addition to the light stabilizer. The UV absorber may include, but is not limited to, a benzotriazole, a benzoate, or a combination thereof, or any combination thereof.

In one embodiment, a halogenated flame retardant may be present in the composition. The halogenated flame retardant may include, but is not limited to, tetrabromobisphenol A (TBBA), tetrabromophthalic acid anhydride, dedecachloropentacyclooctadecadiene (dechlorane), hexabromocyclodedecane, chlorinated paraffins, or any combination thereof.

In one embodiment, a non-halogenated flame retardant may be present in the composition. The non-halogenated flame retardant may include, but is not limited to, resorcinol diphosphoric acid tetraphenyl ester (RDP), ammonium polyphosphate (APP), phosphine acid derivatives, triaryl phosphates, trichloropropylphosphate (TCPP), magnesium hydroxide, aluminum trihydroxide, antimony trioxide.

In one embodiment, a lubricant may be present in the composition. The lubricant may include, but is not limited to, silicone oil, waxes, molybdenum disulfide, or any combination thereof.

In one embodiment, a colorant may be present in the composition. The colorant may include, but is not limited to, inorganic and organic based color pigments.

In one aspect, an acid scavenger may be present in the polymer composition. The acid scavenger, for instance, may comprise an alkali metal salt or an alkaline earth metal salt. The salt can comprise a salt of a fatty acid, such as a stearate. Other acid scavengers include carbonates, oxides, or hydroxides. Particular acid scavengers that may be incorporated into the polymer composition include a metal stearate, such as calcium stearate. Still other acid scavengers include zinc oxide, calcium carbonate, magnesium oxide, and mixtures thereof.

These additives may be used singly or in any combination thereof. In general, each additive may be present in an amount of at least about 0.05 wt. %, such as at last about 0.1 wt. %, such as at least about 0.25 wt. %, such as at least about 0.5 wt. %, such as at least about 1 wt. % and generally less than about 20 wt. %, such as less than about 10 wt. %, such as less than about 5 wt. %, such as less than about 4 wt. %, such as less than about 2 wt. %. The sum of the wt. % of all of the components, including any additives if present, utilized in the polymer composition will be 100 wt. %.

The present disclosure may be better understood with reference to the following example. The following example is given below by way of illustration and not by way of limitation.

Example 1

The following example was conducted to demonstrate some of the benefits and advantages of the present disclosure.

Various different polyethylene polymers were produced in accordance with the present disclosure having a relatively narrow molecular weight distribution. Samples were prepared in a continuous polymerization pilot reactor. Ethylene polymerization was carried out using hexane as a polymerization medium while a Ziegler-Natta catalyst and an organoaluminium as catalyst/cocatalyst system was used. Molecular weight was adjusted by varying hydrogen concentration. All the chemicals were purged with inert gases prior to polymerization and during the polymerization inert atmosphere was constantly applied. At the end of the polymerization, polymer particles suspended in a reaction medium were filtered out and dried afterwards.

Sample Nos. 1 through 5 in the below table were made according to the present disclosure. These samples were compared to commercial polyethylene polymers, which are labeled as Sample Nos. 6 through 8 in the table below.

| Sample No. | IV (ml/g) | MW (kg/mol) | MFR (190/21.6) (g/10 min) | ICP (kPa) | PDI (HT-GPC) |
| --- | --- | --- | --- | --- | --- |
| 1 | 471 | 540 | 0.81 | 174 | NA |
| 2 | 541 | 664 | 0.52 | 178 | 6.1 |
| 3 | 555 | 690 | 0.42 | 177 | NA |
| 4 | 573 | 724 | 0.37 | 170 | NA |
| 5 | 654 | 881 | 0.21 | 179 | NA |
| 6 | 461 | 520 | 1.04 | 124 | NA |
| 7 | 541 | 660 | 0.51 | 131 | 8.9 |
| 8 | 686 | 946 | NA | 130 | NA |

The above samples were gel extruded using a solid content of 30 wt. % resin and paraffin oil at a temperature of from about 190° C. to about 240° C. and a screw speed of 200 rpm. After extrusion, the resulting membrane was solidified on a chill roller set to 40° C. Stretching was performed in a 7×7 ratio (MD/TD) at a temperature of 120° C. Extraction of the stretched membranes was performed in acetone. The membranes were annealed at 130° C. for 10 minutes.

The membranes were then tested for various properties and the following results were obtained.

| Sample No. | MW of resin (kg/mol) | Thickness (μm) | Tensile MD (MPa) | Tensile Strength TD (MPa) | Puncture Strength (mN/μm) | Gurley (sec/100 ml) |
| --- | --- | --- | --- | --- | --- | --- |
| 1 | 540 | 9.7 | 95 | 98 | 540 | 139 |
| 2 | 664 | 8.8 | 103 | 103 | 746 | 108 |

-continued

| Sample No. | MW of resin (kg/mol) | Thickness (μm) | Tensile MD (MPa) | Tensile Strength TD (MPa) | Puncture Strength (mN/μm) | Gurley (sec/100 ml) |
|---|---|---|---|---|---|---|
| 3 | 690 | 7.7 | 115 | 115 | 758 | 109 |
| 4 | 724 | 8.5 | 106 | 114 | 753 | 119 |
| 5 | 881 | 9.8 | 116 | 118 | 877 | 170 |
| 6 | 520 | 8.1 | 88 | 88 | 594 | 109 |
| 7 | 660 | 9.0 | 97 | 92 | 704 | 135 |
| 8 | 946 | 11.0 | 117 | 113 | 938 | 182 |

Figure 2:
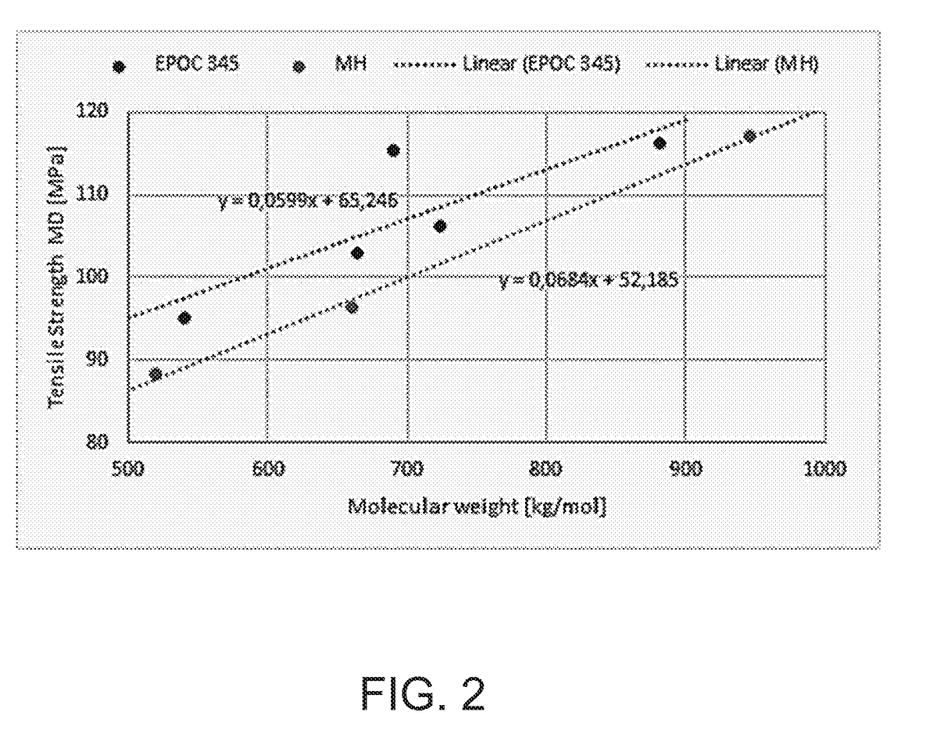
FIG. 2 is a graphical representation of some of the results obtained in the example below.

FIG. 2 is a graphical representation of the machine direction tensile strength versus the molecular weight of the samples. As shown in FIG. 2, samples made with a polyethylene having a narrower molecular weight distribution had dramatically improved strength properties.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims

What is claimed:

1. A polymer composition for producing gel extruded articles comprising:
   a plasticizer; and
   high density polyethylene particles comprising a high density polyethylene polymer, the high density polyethylene particles having a median particle size by volume of greater than about 50 microns, the high density polyethylene polymer having an intercrossing point (ICP) of greater than about 150 kPa.

2. A polymer composition as defined in claim 1, wherein the high density polyethylene polymer has a polydispersity index (PDI) of less than about 8.

3. A polymer composition as defined in claim 1, wherein the high density polyethylene polymer has an intercrossing point (ICP) of greater than about 168 kPa and has a polydispersity index (PDI) of less than about 6.5.

4. A polymer composition as defined in claim 1, wherein the high density polyethylene particles have a median particle size by volume of from about 70 microns to about 210 microns.

5. A polymer composition as defined in claim 1, wherein the high density polyethylene particles are present in the composition in an amount up to about 50% by weight.

6. A polymer composition as defined in claim 1, wherein the plasticizer comprises mineral oil, a paraffinic oil, a hydrocarbon, an alcohol, an ether, an ester, or mixtures thereof.

7. A polymer composition as defined in claim 1, wherein the high density polyethylene polymer has a molecular weight of greater than about 400,000 g/mol and less than about 4,000,000 g/mol.

8. A polymer composition as defined in claim 7, wherein the composition only contains a single high density polyethylene polymer.

9. A polymer composition as defined in claim 1, wherein the polymer composition is polypropylene-free.

10. A polymer composition as defined in claim 1, wherein the high density polyethylene polymer has been Ziegler-Natta catalyzed.

11. A polymer composition as defined in claim 1, wherein the high density polyethylene polymer has a bulk density of greater than about 0.31 g/cm$^3$ and the high density polyethylene particles have a median particle size by volume of less than about 150 microns.

12. A polymer composition as defined in claim 11, wherein the high density polyethylene polymer has a molecular weight of greater than about 1,000,000 g/mol.

13. A polymer composition as defined in claim 11, wherein the high density polyethylene polymer has a molecular weight of less than about 3,000,000 g/mol.

14. A molded article formed from the polymer composition as defined in claim 1, wherein the molded article contains the plasticizer in an amount of less than about 2% by weight, such as in an amount less than about 1% by weight.

15. A molded article as defined in claim 14, wherein the molded article comprises a film or a fiber.

16. A process for producing polymer articles comprising:
   forming the polymer composition as defined in claim 1 into a gel-like composition; and
   extruding the gel-like composition through a die to form a polymer article, the polymer article comprising a film.

17. A process as defined in claim 16, further comprising the step of removing at least part of the plasticizer from the polymer article.

18. A porous membrane comprising:
   a high density polyethylene polymer having an intercrossing point (ICP) of greater than about 150 kPa, the high density polyethylene polymer having a molecular weight of greater than about 400,000 g/mol, the porous membrane having a tensile strength in at least one direction of greater than about 90 MPa and having a puncture strength of greater than about 500 mN/μm;
   wherein the porous membrane is formed from a polymer composition comprising high density polyethylene particles.

19. A porous membrane as defined in claim 18, wherein the membrane has a thickness of from about 7 microns to about 11 microns.

20. A porous membrane as defined in claim 18, wherein the membrane has a Gurley permeability of greater than about 105 sec/100 ml.

21. A porous membrane as defined in claim 18, wherein the porous membrane has a puncture strength of greater than about 700 mN/μm.

22. A porous membrane as defined in claim 18, wherein the porous membrane has been biaxially stretched.

23. A porous membrane as defined in claim 18, wherein the high density polyethylene polymer has a bulk density of greater than about 0.31 g/cm³ and the high density polyethylene particles have a median particle size by volume of less than about 150 microns.

24. A porous membrane as defined in claim 23, wherein the high density polyethylene polymer has a molecular weight of greater than about 1,000,000 g/mol.

25. A porous membrane as defined in claim 23, wherein the high density polyethylene polymer has a molecular weight of less than about 3,000,000 g/mol.

26. A porous membrane as defined in claim 23, wherein the porous membrane has a puncture strength of greater than about 600 mN/μm.

27. A porous membrane as defined in claim 26, wherein the porous membrane has a puncture strength of less than about 1,200 mN/μm.

28. A polymer composition for producing gel extruded articles comprising:
   a plasticizer; and
   high density polyethylene particles comprising a high density polyethylene polymer, the high density polyethylene polymer having a molecular weight of greater than about 400,000 g/mol, the high density polyethylene polymer having an intercrossing point (ICP) of greater than about 150 kPa.

29. A polymer composition as defined in claim 28, wherein:
   the high density polyethylene polymer has a bulk density of greater than about 0.31 g/cm³;
   the high density polyethylene polymer has a polydispersity index (PDI) of less than about 8;
   the high density polyethylene particles have a median particle size by volume of less than about 150 microns; and
   the high density polyethylene polymer has an intercrossing point (ICP) of greater than about 168 kPa.

30. A polymer composition as defined in claim 28, wherein:
   the high density polyethylene polymer has a bulk density of greater than about 0.31 g/cm³;
   the high density polyethylene polymer has a polydispersity index (PDI) of less than about 6.5; and
   the high density polyethylene particles have a median particle size by volume of less than about 150 microns.

* * * * *